United States Patent [19]
Blomfield-Brown

[11] Patent Number: 5,625,678
[45] Date of Patent: Apr. 29, 1997

[54] METHOD AND SYSTEM FOR ALLOWING SWITCHED VOICE AND DATA COMMUNICATION AMONG MULTIPLE APPLICATION PROGRAMS

[75] Inventor: Christopher Blomfield-Brown, Seattle, Wash.

[73] Assignee: Microsoft Corporation, Redmond, Wash.

[21] Appl. No.: 448,815

[22] Filed: May 24, 1995

[51] Int. Cl.$^6$ .................................................. H04M 11/00
[52] U.S. Cl. ................................................ 379/93; 379/98
[58] Field of Search ................................. 379/93, 94, 96, 379/97, 98; 375/222; 370/85.13

[56] References Cited

U.S. PATENT DOCUMENTS

| | | | |
|---|---|---|---|
| 5,086,453 | 2/1992 | Senoo et al. | 379/93 |
| 5,164,982 | 11/1992 | Davis | 379/96 |
| 5,321,840 | 6/1994 | Ahlin et al. | 395/700 |
| 5,365,577 | 11/1994 | Davis et al. | 379/96 |
| 5,371,852 | 12/1994 | Attanasio et al. | 370/85.13 |

FOREIGN PATENT DOCUMENTS

| | | | |
|---|---|---|---|
| 000392816 | 10/1990 | European Pat. Off. | 375/222 |
| WO94/26056 | 11/1994 | WIPO . | |

*Primary Examiner*—Stella Woo
*Attorney, Agent, or Firm*—Klarquist Sparkman Campbell Leigh & Whinston

[57] ABSTRACT

A method and system for allowing multiple application programs to communicate in the context of a switched voice and data communication. The method includes providing a communication interface between multiple application programs and a router module in a sending and receiving system, and then using the router module to format data from one or more application programs into a single data block. During a brief interruption of the voice portion of the call, the sending system transfers the data block to the receiving system where the data block is interpreted and then routed to corresponding application programs. The system includes a router module to format data, a communication interface to couple applications to the router module, a communication port to transfer data over a phone line, through a communication device and a call manager module for performing line control.

16 Claims, 7 Drawing Sheets

METHOD AND SYSTEM FOR ALLOWING SWITCHED VOICE AND DATA COMMUNICATION AMONG MULTIPLE APPLICATION PROGRAMS

FIELD OF THE INVENTION

The invention relates generally to the field of switched voice and data communication where voice and computer data may be transferred over a single phone line during a phone call. More specifically, the invention relates to a method and system for enabling multiple application programs running simultaneously on computers on each end of a phone line to communicate in a switched voice data environment.

BACKGROUND AND SUMMARY OF THE INVENTION

Technology now exists enabling switched voice and data communications over a single telephone connection. Switched voice and data communication is the process of temporarily blocking a telephone conversation during a call, sending data over the same connection, and then immediately returning to the conversation. A switched voice and data communication involves two modes of operation: voice mode where voice data is transferred between callers, and data mode where, for example, a binary data file is transferred between each caller's computer.

Combining voice and data communication in a single phone call opens the door to improved communication opportunities and a range of software applications to support such communication. Using switched voice and data communication, computer data such as text or graphics may be transferred and viewed by participants in a phone call as they converse on the phone. For instance, callers can discuss the same spread sheet file over the phone as they view it on their computer screens. Documents may be sent to and displayed on each caller's computer screen or screen phone during a call.

A communication device such as a fax or data modem used to transfer data over the telephone network must be modified or specifically built to support such switched voice and data communication. A communication device having this capability contains data circuit terminating equipment (DCE) to support time-multiplexed voice and data communications. The DCE generally includes a telephone network interface, a data terminal equipment (DTE) interface, and a local telephone interface. Linking the DCE to a telephone line, the telephone network interface couples the DCE to a general switched telephone network (GSTN). The telephone network interface is typically an analog telephone line connected to telephone network switch. The DTE interface couples the DCE to a data terminal device such as a personal computer (PC) for communicating commands and data to the DCE. Finally, the local telephone interface couples the DCE to a telephone for interactive voice communication.

A variety of communication devices may be equipped with switched voice and data communication capability. A DCE may be incorporated into communication devices such as modems, specialized telephones, and automated messaging systems. The DCE may be incorporated into a modem that is linked as follows: 1) to a local telephone through the local telephone interface, 2) to a PC through the DTE interface, and 3) to the GSTN through the telephone network interface. The DCE may also be incorporated into specialty phones such as a screen phone, in which case the local telephone interface may be implemented internally. A screen phone may not require a DTE interface if it has local data storage capability and the ability to display information. As another example, the DCE may be incorporated into a Voice Response Unit (VRU). A VRU is a device used in automated messaging. When incorporated into a VRU, the DCE can be used to transfer graphical information to accompany the computer generated voice messages of the VRU.

A communication device such as a modem equipped with switched voice-data capability operates as follows. When in voice mode, the modem supports standard interactive voice communication and acts as a monitor, looking for events that trigger a change to data mode. The modem monitors the voice communication connection and the data connection for specific events and changes its mode appropriately in response. When one person wants to send data to the other person on a call, the sending modem temporarily mutes the handset and sends a signal directing the receiving modem to switch to data mode. When the receiving modem receives the signal, it mutes the handset and prepares to receive data. After transferring the data, both modems unmute their handsets and normal conversation ensues.

To transfer files such as spread sheets or word processing documents, the computers of the respective participants in a the call act as DTEs, transferring commands and data to the DCE in a sending and receiving modem coupled to the respective computers. Through the sending modem, the sending computer transfers data from an application program to the receiving modem. The receiving modem then transfers this data to an application program in the receiving computer in response to commands issued by the computer. In this manner, the participants in the phone call can view the same data on their computer terminals while they discuss it over the phone.

Though switched voice communication can enhance interactivity between remote users of application programs, existing technology does not support simultaneous communication among more than one application program on each end of a telephone call. Only one application program can communicate with a modem at a time. This is a significant drawback because it prevents participants in a switched voice and data call from transferring data between more than one application program at once.

This drawback of existing switched voice and data technology arises from a limitation in the design supporting the communication. Current systems use a command set that fails to support communication among more than one application program. In a switched voice and data communication, the DTE such as a PC issues commands to the DCE such as a modem to control the transfer of data over the telephone line. In current systems, these control commands are standard AT commands based upon extensions to the TIA/EIA 602 and TIA/EIA 615 AT commands. These commands merely allow a single application to transfer data or to listen for a call at one time. The commands do not support transferring data to or from several applications at the same time.

SUMMARY OF THE INVENTION

To address the limitations and drawbacks of existing systems, the invention provides a method and system for allowing multiple application programs to communicate in the context of a switched voice and data communication session. A method according to one embodiment of the invention begins by establishing communication between a sending and receiving system with switched voice and data capabilities. The sending and receiving system typically include a modem capable of switching between voice and data transfer coupled to a computer, a telephone, and the telephone line. The computers include an application programming interface (API) to application programs, a router module and a communication device interface. After a connection is established, data can be transferred among application programs in the computers of the sending and receiving systems. Under the control of the computer, the modem temporarily blocks voice transfer and transfers data among applications running in the computers of the sending and receiving systems.

To transfer data among applications, a method according to an embodiment of the invention includes the following steps. Data is transferred from one or more application programs to the router module in the sending computer through the API. A protocol identification number is assigned to identify data from a first and second application program and then this data is routed to the router module in the receiving system. To transfer the data to corresponding application programs in the receiving system, the router module transfers the data using protocol identification numbers, which uniquely identify the destination applications.

A system according to one embodiment of the invention includes a communication device interface for communicating with a telephone communication device, an API, a call manager module, and a router module. The communication interface enables one or more application programs to transfer data to the router module. The router module receives data from one or more applications and formats the data into a data block so that it may be transferred through the communication device interface. The router module also receives data from the communication device interface, interprets a header byte in the data block, and then routes the data to the proper application programs. The router module communicates with the call manager module to control the telephone connection and switch between data and voice transfer modes.

The methods and systems according to the invention enable multiple application programs to communicate over a phone line during a single switched voice and data communication. Data from a number of application programs may be sent in a single data block, causing only a brief interruption in the voice communication. Many variations in the way data is transferred are possible using the principles of the invention. In one alternative, an application may wait until another application sends data during a switched voice and data communication and then "piggyback" its data with data from the other application. This approach minimizes intrusion into the voice portion of the call because the call is only interrupted once when the second application sends data. In another alternative, multiple applications may send data and then request replies for return data. With the use of special unique protocol ID numbers, a switched voice and data system according to the invention can route data to a specific application, or to different applications if the applications are compatible.

Further advantages and features of the invention will become apparent to those skilled in the art from the following description and accompanying drawings.

DETAILED DESCRIPTION OF A PREFERRED EMBODIMENT

The invention provides a method and system for allowing multiple applications running in remote computers to share data during an interactive voice communication. The following description begins with an overview of a communication system embodying the invention. Next, the system and a method according to the invention are described. Finally, the method according to the invention is described with reference to examples illustrating how data may be transferred among applications.

Figure 1:
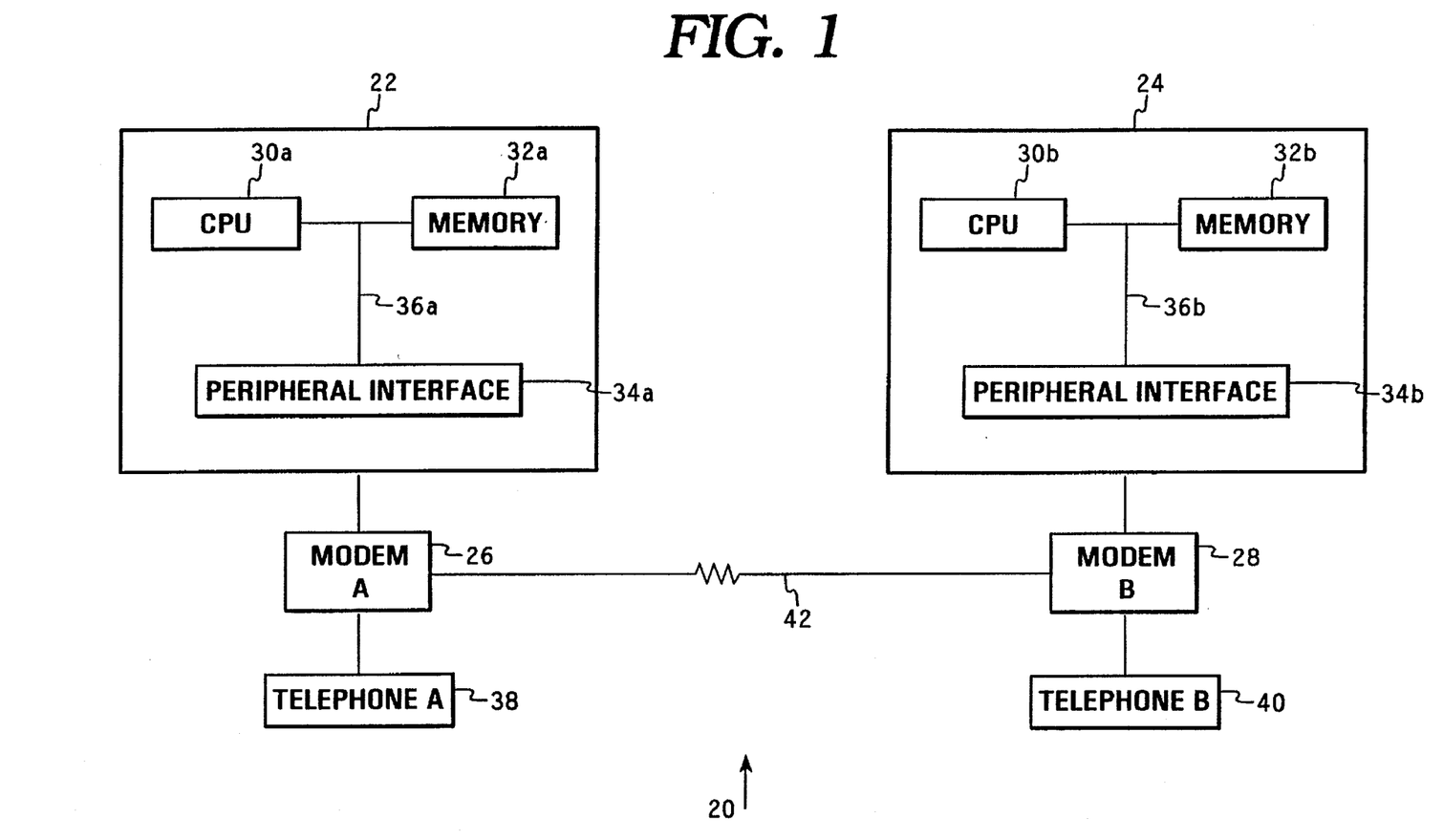
FIG. 1 illustrates a block diagram of a communication system in which the invention may be implemented.

FIG. 1 illustrates a block diagram of a communication system 20 in which the invention may be implemented. This system includes first and second computer systems 22, 24, each coupled to a modem 26, 28. Each computer system includes a central processing unit 30a, 30b, memory 32a, 32b, and a peripheral interface 34a, 34b coupled together through a bus 36a, 36b. The bus 36a, 36b may carry data and control signals as well as power to the various components in the computer system 22, 24. The memory 32a, 32b may include random access memory (RAM) and read only memory (ROM). The peripheral interface 34a, 34b for coupling the computer system to the modems is a serial interface that supports a character serial bi-directional data stream. A variety of hardware could be used for the peripheral interface 34a, 34b generally, including parallel ports or an ISA (Industry Standard Architecture) bus implementation. The first computer 22 is coupled to modem A 26 through its peripheral interface 34a, and similarly, the second computer 24 is coupled to modem B 28 through its peripheral interface 34b. The respective modems 26, 28 are of conventional design and are each coupled to a local telephone, telephone A 38 and telephone B 40.

Modem A 26 and B 28 communicate through an analog telephone line 42. Both modem A and B are adapted to support switched voice and data communication. Specifically, both Modems A and B support the Voiceview protocol from Radish Communications Systems, Inc., of Boulder, Colo. More information on the switched voice and data communication is provided in the following patents and patent application of Radish Communications:

(1) U.S. Pat. No. 5,164,982 entitled "Telecommunication Display System", issued Nov. 17, 1992;

(2) U.S. Pat. No. 5,365,577 entitled "Telecommunication Display System", issued Nov. 15, 1994; and (3) PCT Patent Application No. PCT/US/94/04893 entitled "Improved Features for a Telecommunications Display System", filed May 2, 1994, published as WO 94/26056 on Nov. 10, 1994, and claiming priority from U.S. patent application Ser. No. 08/056,526, filed Apr. 30, 1993.

U.S. Pat. Nos. 5,164,982 and 5,365,577, and PCT Patent Application No. PCT/US/94/04893 are hereby incorporated by reference.

Modems A and B communicate with the respective computers through a DTE interface for transferring commands and data. The computers 22, 24 issue commands to the modems 26, 28 to control basic switched voice and data communication. These commands include instructions to set up a phone call, mute the voice portion of a phone call, and initiate the transfer of data during the call. These commands include standard AT commands found in the TIA/EIA 602 and TIA/EIA 615 as listed in Table 1 below.

TABLE 1

| Commands | Name |
| --- | --- |
| ATD | Dial Call |
| ATA | Answer Call |
| ATH | Hook Control |
| ATZ | Reset to Default Configuration |
| AT-SAC | Accept Data Mode Request |
| AT-SIP | Initialize VoiceView Parameters |
| AT-SIC | Reset Capabilities Data to Default Setting |
| AT-SSQ | Initiate Capabilities Query |
| AT-SDA | Originate Modem Data Mode |
| AT-SFX | Originate FAX Data Mode |
| AT-SRM | Retrieve Message |
| AT-SEM | Erase Message |
| AT-SMT | Mute Telephone |

In addition to the DTE interface, the modem also includes a telephone network interface and a local telephone interface to support switched voice and data communication. The telephone network interface couples the modem to the analog telephone line and includes a switching device for switching between voice and data communication. The local telephone interface couples the modems to a local telephone for supporting voice communication. Through the telephone network interface and local telephone interface, the modems switch between voice communication according to the commands from the respective computers.

Figure 2:
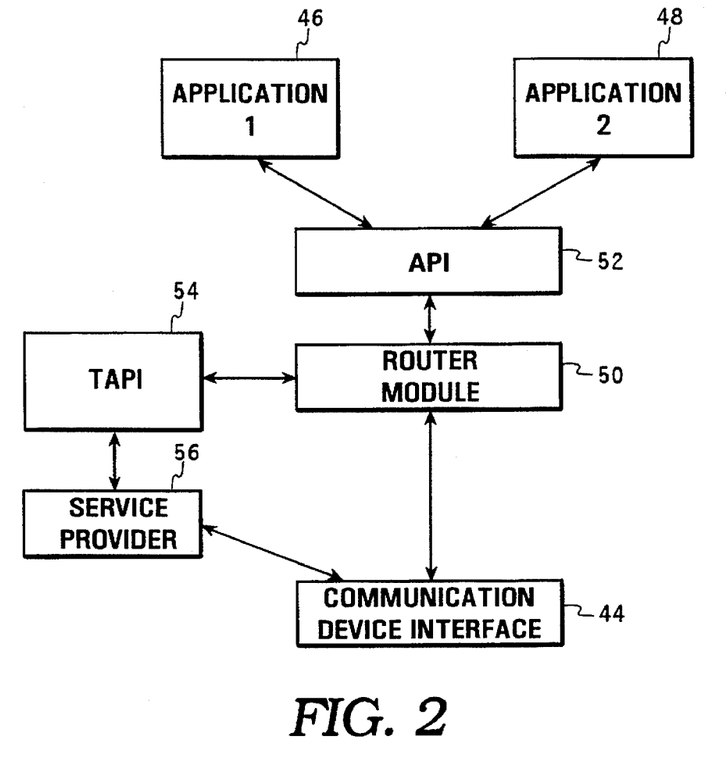
FIG. 2 is a block diagram of a system embodying the invention.

FIG. 2 is a block diagram of a system embodying the invention. In this embodiment, the system is implemented in software loaded in memory of a computer system. As will be described, the system incorporates a number of components of the Windows operating system. The communication device interface 44 is the link between the system and a communication device such as modem 26 coupled to the computer system 22 at the peripheral interface 34a. A number of application programs running in the computer, such as APPLICATION_1 46, and APPLICATION_2 48, may communicate with a router module 50 through API 52. The API 52 may be any of a number of well-known communication mechanisms such as TCP/IP or IPX. As described below however, the communication interface 52 in the preferred embodiment includes sockets based on Berkeley Sockets developed at the University of California at Berkeley. The router module 50 routes data from the applications 46, 48 to corresponding applications running in another computer.

To aid the router module in call management, the router module is coupled to a telephony application programming interface (TAPI) 54. TAPI 54 is a software module used by application programs to control telephony connection management in the Windows operating system. TAPI 54 controls the connection of a telephone call, including both handset and line control. TAPI 54 is also used to determine call ownership among one or more application programs. The router module 50 communicates with TAPI 54 to control a telephone communication. Additional documentation of the Telephony Application Programming Interface 54 is provided in co-pending application Ser. No. 08/356,059, entitled "Device Independent Modem Interface", filed Dec. 13, 1994, which is hereby incorporated by reference.

TAPI 54 provides control of telephone communication by making function calls to a telephony service provider 56 and by transferring call information to and from the service provider 56. The service provider 56 acts as a device driver, controlling the connection between a communication device and a communication device interface 44. The communication device interface 44 is an interface to physically couple software modules of the system to a communication device such as a modem through a serial port of a computer system. Both the service provider 56 and the router module 50 may use the communication device interface 44 to send and receive data.

Figure 3:
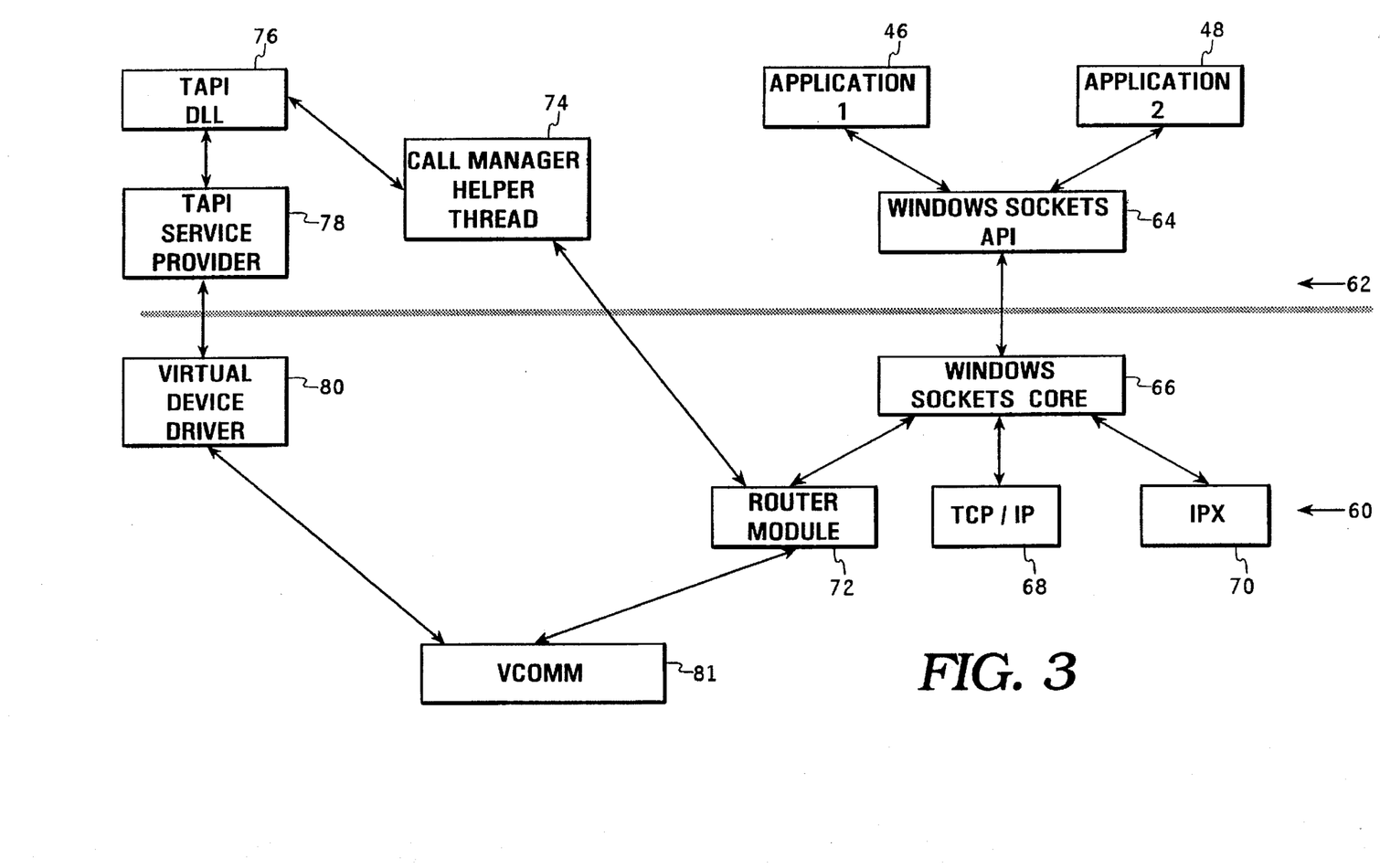
FIG. 3 is a more detailed block diagram of the system of FIG. 2.

FIG. 3 is a more detailed block diagram of the system of FIG. 2. In this particular embodiment, commands and data for telephone communication are passed between applications 46, 48 and a transport layer 60 through sockets 62. The interface between applications and the router module includes the Windows Sockets Application Programming Interface (API) 64 and a Sockets Core module 66.

The Windows sockets API 64 provides an interface for application programs 46, 48 including an interface to enable program developers to create applications to any of a number of network protocol implementations. The Windows Sockets API 64 is implemented in the form of a dynamic linked library that is accessible to one or more application programs. This particular API is the Windows Sockets API publicly available from Microsoft Corporation of Redmond, Wash. The Windows Sockets specification, also available from Microsoft, defines library calls and associated semantics from which compatible application programs and network transport software can be implemented.

The sockets core module 66 communicates data and commands to a network transport layer 60. As an example, FIG. 3 illustrates two standard network transport modules, TCP/IP 68 (Transport Control Protocol/Interface Program) and IPX 70. In this implementation, the router module 72 is implemented as a transport mechanism to transfer blocks of data over the telephone line. Generally, the router module 72 receives data from an application 46, 48 through the sockets 62 and routes the data to a corresponding application in a remote computer system. More details of the structure of the router module 72 are provided below with reference to FIG. 4. The operation of the router module 71 will also be detailed below.

In this implementation, the router module communicates with a call manager helper thread 74 to control a telephone communication. The call manager helper thread 74 makes function calls to TAPI 76 in response to commands from the router module 72 to control a telephone call. The call manager helper thread 74 enables the router module 72 to call the TAPI DLL 76. Since ring 0 code cannot call ring 3 code directly, the call manager helper thread is necessary in this implementation.

As shown in FIG. 3, TAPI 76 is implemented as a dynamic linked library. The TAPI DLL's functions can be shared by a number of processes running in the system. For example, a number of application programs can use the functions in TAPI 76 to provide line and handset control. TAPI 76 provides all of the function calls that applications require to control an analog telephone line. TAPI 76 can also support digital phone line control.

TAPI issues the AT commands to place the modem in the appropriate state. The router then issues AT commands to control the transfer of data.

The TAPI service provider 78, virtual device driver 80 and VCOMM 81 together form a device driver for a communication device. The service provider 78 implements device specific line control functions. In this embodiment where the communication device is a modem, the service provider includes code to perform modem functions such as dialing an outbound call, answering inbound calls, hanging up current calls, etc. Additional documentation on service providers is provided in co-pending application Ser. No. 08/356,059, which is incorporated by reference above. VCOMM 81 is a communication device interface provided in the Windows operating system from Microsoft Corporation. VCOMM 81 is a ring 0 level virtual device that manages access to communication resources in the computer. These "communication resources" include physical or logical devices that provide a single asynchronous data stream. Serial ports, parallel ports, and modems are examples of communication resources. The virtual device driver 81 is ring 0 code that enables the ring 3 service provider to communicate with the ring 0 communication device interface. For more information on VCOMM, see the documentation relating to VCOMM provided in co-pending application Ser. No. 08/356,059, which is incorporated by reference above.

Figure 4:
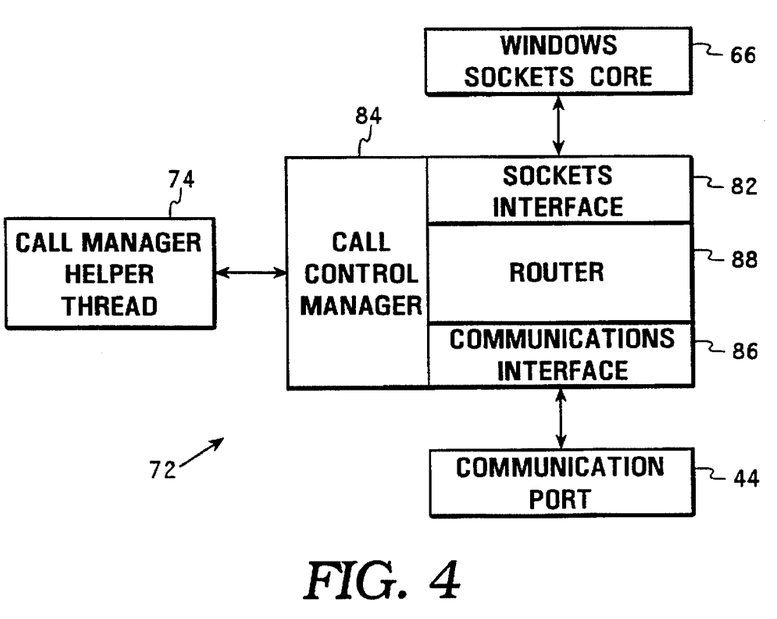
FIG. 4 is a detailed block diagram of the router module of FIG. 3.

FIG. 4 is a detailed block diagram of the router module 50. The router module 50 includes four pieces: the Windows sockets interface 82, a call control manager 84, a communications interface 86, and a router 88. The Windows sockets interface 82 is a platform specific piece of the router module 72 that couples the router module 72 to sockets 66. The call control manager 84 communicates with TAPI 76 through a Call Manager Helper Thread 74.

The communications interface 86 is a portion of the router module 72 that enables the router module 72 to communicate with the communication device interface 44. Finally, the router 88 is responsible for handling data and instructions from application programs and formatting the data so that it may be directed to a specific socket destination in a receiving system.

The router module 72 is used to send information from an application in a sending system to a corresponding application on a receiving system. The router module routes data between application programs using a universal, unique identifier (UUID). When assigned to an application, the UUID identifies the application that should receive data. Usually, only one application is associated with a specific UUID. However, if two or more applications inter-operate, they may share the same UUID.

In this implementation, the communication between applications 46, 48 and the router module 72 is carried out through extensions to the existing Windows Sockets API. A socket address data structure, sockaddr, has been modified to support switched voice and data communication. Some functions in the Windows Sockets API have modified capabilities in the context of a system for allowing switched voice and data communication among multiple applications.

The socket address structure is set forth below:

```
sockaddr
struct sockaddr_vv {
    u_short     sa_family;        /* socket address format                        */
    u_short     wFlags;           /* specifies optional behavior on a connection  */
    DWORD       dwDeviceId;       /* TAPI device ID to use for connections        */
    u_char      uuidProtocol[16]  /* socket protocol                              */
};
```

In the context of a switched voice and data communication, the sockaddr structure includes additional information. The uuidProtocol field includes the UUID number associated with an application for use in exchanging data. The dwFlags field is set to a variable reflecting that a capabilities query is to be issued. Capabilities queries are used to ensure that the receiving device has switched voice and data communication capability. The dwDeviceId field is set to a variable enumerating a communication or line device to be used in subsequent calls. This is relevant when a system includes more than one line device.

The following Windows Sockets functions use the modified socket address structure:

```
accept
SOCKET PASCAL FAR accept(s, addr, addrlen)
SOCKETs;                           /* socket listening for connections        */
struct sockaddr FAR * addr;        /* address structure for connecting entity */
int FAR * addrlen;                 /* length of address structure             */
bind
int PASCAL FAR bind(s, name, namelen)
SOCKETs;                           /* unbound socket to associate             */
const struct sockaddr FAR * name;  /* address structure assigned to socket    */
int namelen;                       /* length of address structure             */
connect
int PASCAL FAR connect(s, name, namelen)
SOCKETs;                           /* unconnected socket to use               */
const struct sockaddr FAR * name;  /* address structure assigned to socket    */
int namelen;                       /* length of address structure             */
getpeername
int PASCAL FAR getpeername(s, name, namelen)
SOCKETs;                           /* bound socket                            */
struct sockaddr FAR * name;        /* address structure to receive address    */
int FAR * namelen;                 /* length of address structure             */
getsockname
int PASCAL FAR getsockname(s, name, namelen)
SOCKETs;                           /* bound socket                            */
struct sockaddr FAR * name;        /* address structure to receive address    */
int FAR * namelen;                 /* length of address structure             */
recvfrom
int PASCAL FAR recvfrom(s, buf, flags, from, fromlen)
SOCKETs;                           /* bound socket to receive data            */
char FAR * buf;                    /* buffer to receive incoming data         */
int len;                           /* length of buffer                        */
int flags;                         /* species optional behavior of the call   */
struct sockaddr FAR * from;        /* address structure to receive source address */
int FAR * fromlen;                 /* length of address structure             */
sendto
int PASCAL FAR sendto(s, buf, len, flags, to, tolen)
SOCKETs;                           /* connected socket on which to send       */
const char FAR * buf;              /* buffer containing data to transmit      */
int len;                           /* length of data in buffer                */
int flags;                         /* specifies optional behavior of the call */
const struct sockaddr FAR * to;    /* address structure for destination socket */
int tolen;                         /* length of address structure             */
```

The preceding function calls each use the modified sockaddr structure in the context of a switched voice and data communication system. These function calls use the sockaddr structure to perform the following functions: the accept function receives address information about the connecting entity; the bind function associates a protocol ID with a socket; the connect function specifies a protocol ID for a socket; the getpeername function receives the address information of a peer socket; the getsockname function receives address information of a local socket; the recvfrom function receives a protocol ID for a socket; and the sendto function specifies the protocol ID for the destination socket.

A number of functions in the Windows API have modified capabilities when used in this system according to an embodiment of the invention. In addition to the function calls already listed, relevant functions are set forth below:

```
getsockopt
int PASCAL FAR getsockopt(s, level, optname, optval, optlen)
SOCKETs;                           /* socket from which to retrieve option    */
int level;                         /* level at which option is defined        */
int optname;                       /* option to retrieve                      */
char FAR * optval;                 /* pointer to buffer to receive value      */
int FAR * optlen;                  /* pointer to length of buffer             */
setsockopt
int PASCAL FAR setsockopt(s, level, optname, optval, optlen)
SOCKETs;                           /* socket to set option on                 */
int level;                         /* level at which option is defined        */
int optname;                       /* option to set                           */
char FAR * optval;                 /* pointer to buffer of supplied value     */
int FAR * optlen;                  /* pointer to length of buffer             */
listen
int PASCAL FAR listen(s, backlog)
SOCKETs;                           /* bound, unconnected socket to listen on  */
int backlog;                       /* size of queue for pending connections   */
send
int PASCAL FAR send(s, buf, len, flags)
SOCKETs;                           /* connected socket on which to send       */
```

```
const char FAR * buf;            /* buffer containing data to transmit    */
int len;                         /* length of data in buffer              */
int flags;                       /* specifies optional behavior of the call */
select
int PASCAL FAR select(nfds, readfds, writefds, exceptfds, timeout)
int nfds;                        /* unused                                */
fd_set FAR * readfds;            /* sockets to check for readability      */
fd_set FAR * writefds;           /* sockets to check for writeability     */
fd_set FAR * exceptfds;          /* sockets to check for errors           */
const struct timeval FAR * timeout;  /* only NULL supported               */
socket
SOCKET PASCAL FAR socket(af, type, protocol)
int af;                          /* address format specification          */
int type;                        /* type specification for new socket     */
int protocol;                    /* not supported                         */
```

The getsockopt retrieves a socket option, and the setsockopt sets a socket option.

The bind function associates a local address with a socket, and the listen function establishes a socket to listen for an incoming connection. An application must call the bind function before it calls the listen function.

The send and sendto function calls are called by applications to send data. An application calls the send function to send data on a connected socket, and calls the sendto function to send data to a specific destination. Both of these functions may include additional values in the flags parameter. One value in this flag parameter may represent a capabilities query to determine whether a receiving system has switched voice and data capability. Another value may indicate that an application requests a reply from an application in a receiving system.

The select function call enables an application to check the status of one or more sockets.

The socket function call is used to create a socket. The af field specifies the format of the address. When a socket is used as a communication interface to applications in the context of switched voice and data communication, the af field is set to a value indicating the switched voice and data format. The type specification identifies the type of data transferred through the socket. The protocol parameter is not supported in this implementation because the uuidProtocol field of the sockaddr structure is used instead to convey the socket protocol.

Using the Windows sockets as described above, application programs may transfer data to corresponding application programs in a receiving system. Applications transfer data to the router module in the sending system, which then places the data in the proper format and routes it to the router module in a receiving system. The router module in the receiving system interprets the information passed over the telephone line and routes data to the appropriate application through sockets associated with the applications. The manner in which commands and data are transferred over the telephone line is described below.

The following description sets forth the operation of a system in various telephone transactions. FIGS. 5–8 are a set of flow diagrams illustrating the steps of these transactions. Table 2 below sets forth the transaction type, transaction signature, and associated commands and data for transactions in a switched voice and data communication according to an embodiment of the invention.

TABLE 2

| Transaction Type | Transaction Signature | Commands and Data |
|---|---|---|
| Implicit Socket Data | 0x00 | <0x00> <UUID> <LENG> <DATA> |
| Explicit Socket Data | 0x01 thru 0xED | <0x01 thru 0xED> <LENG> <DATA> |
| First Connection | 0xEE | <0xEE> <Version: 0x10> <UUID Session Id> <LENG> <Session DATA> <UUID Socket Id> <Socket Id, random: 0x01 to 0xED> <LENG> <Socket DATA> |
| New Connection | 0xEF | <0xEF> <Socket Id, random: 0x01 to 0xED> <LENG> <Socket DATA> |
| End Connection | 0xF0 | <0xF0> <Socket Id: 0x01 to 0xED> |
| Enumerate Valid Sockets | 0xF1 | <0xF1> <Number of Sockets> <List of UUID values> |
| Error | 0xF2 | <0xF2> <Error Id byte> { <LENG> <DATA> } |
| Verify Connection | 0xF3 | <0xF3> <UUID Session Id> |
| Request User Information | 0xF4 | <0xF4> |
| User Information | 0xF5 | <0xF5> <LENG> <DATA> |

Figure 5:
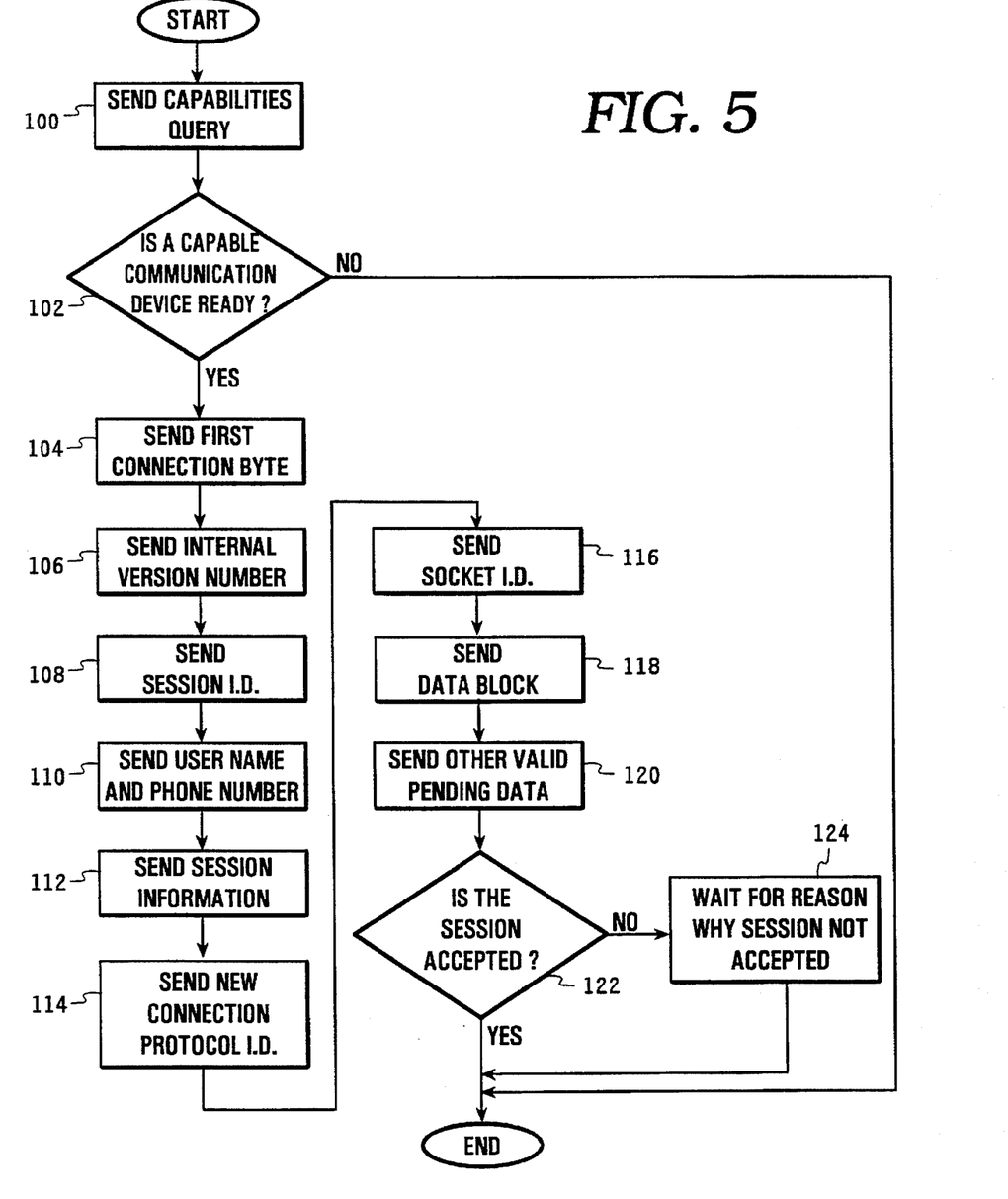
FIG. 5 is a flow diagram illustrating the steps taken during a first connection in a switched voice and data communication.

FIG. 5 is a flow diagram illustrating the steps taken during a first connection. Table 2 sets forth an example of the commands and data sent during a first connection. A first connection is the first time a new data transaction occurs over an existing voice call between two communication devices such as a sending modem and a receiving modem. FIG. 1 is an example of a system in which such a transaction could take place, but there are many other communication configurations that could support a switched voice and data communication according to the invention.

A first connection begins with a capabilities query to determine whether the receiving device has switched voice and data capability (100). An application in the sending system can issue a capabilities query by setting a flag in a send function call made to the receiving system. Alternatively, an application can issue a capabilities query when making a connection by setting a flag in the sockaddr structure for the connect function call.

In an alternative implementation, a capabilities query does not have to be transferred first. Instead, the sending modem can proceed as if there is an available modem on the receiving side. If there is no receiving modem, or if it is unavailable, an error message will be returned.

If the receiving device has switched voice and data capability and is ready to receive data (102), then the sending modem sends a first connection byte ID as a header byte (104). The connection byte ID may be followed by an internal version number (106). Next, the session ID is sent, for example, in the form of a 16 byte UUID number (108). As an option, the user's name and phone number may then be sent using the format <leng><data>, which means the length of the data is first identified followed by the data itself (110).

More session information may then be sent (112). Typical session information may include information about the sending system such as the operating system residing on the data terminal device coupled to the sending modem.

Next, the router module in the sending system transfers the connection protocol ID (114). This protocol ID number is a 16 byte UUID number that is guaranteed to be unique. Next, a socket ID is sent (116). The socket ID is randomly selected from 0×01 to 0×ED. After the first connection, the socket ID is used as a header byte to specify where data is to be sent. The shorter socket ID number is used rather than the relatively lengthy protocol ID number because it is easier and faster to send. The socket ID need not be random, but using a random number is preferred because it helps to differentiate between calls. If the socket ID were not random, but rather, was simply a number starting with 0 for each call, then it would be very difficult to determine whether the socket ID number of 0 referred to the same or a different call.

Once the socket is identified, the data may be sent (118). The format of the data block is <length><data>. This format is described in further detail in a document entitled, ASN Lengths Standard Document. Any other valid pending data or connection data may also be sent (120).

After sending the data, the sending system waits for a signal indicating whether the session has been accepted on the receiving end (122). If the session has been accepted, then the first connection transaction is over. Other transactions may occur after the first connection, but once all pending data and/or connection information is sent and successfully accepted, the first connection is complete. If the session has not been accepted, then the receiving device transfers information reflecting why the session was not successfully started (124).

Figure 6:
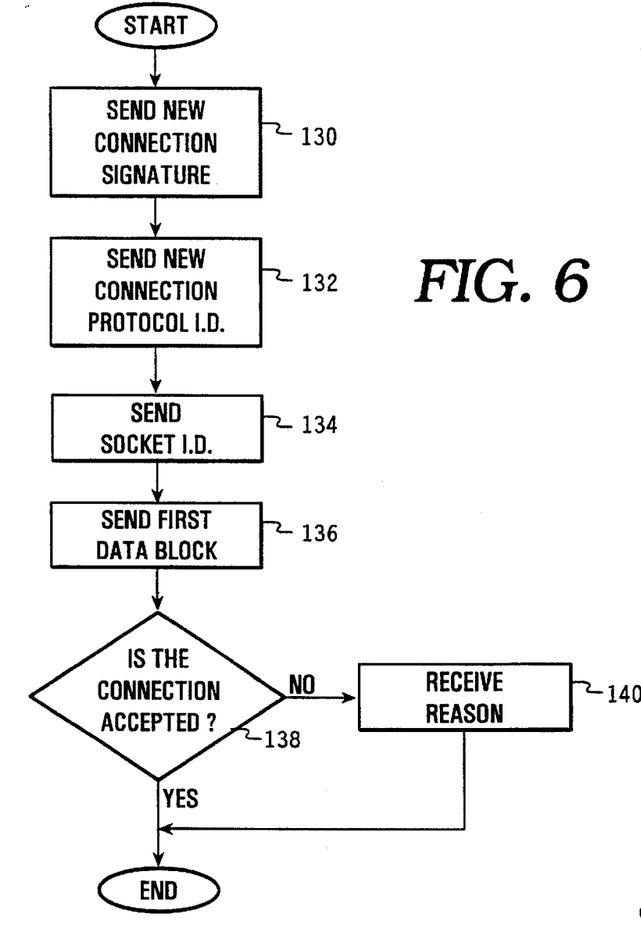
FIG. 6 is a flow diagram illustrating the steps taken during a new connection in a switched voice and data communication.

FIG. 6 is a flow diagram illustrating the steps taken during a new connection. Table 2 sets forth an example of the commands and data sent during a new connection. A new connection, as opposed to a first connection, occurs after the first connection when an application wishes to send data to a corresponding application at the receiving end.

A new connection begins when the router module in the sending system sends a new connection signature in a header byte (130). Next, a protocol ID is sent (132). The protocol ID is preferably a 16 byte UUID number, guaranteed to be unique. Using this 16 byte UUID number ensures that the first application communicates with a compatible application in the receiving system. A socket ID to be associated with this particular connection is then sent (134). Just as in a first connection, a socket ID number is randomly picked to avoid potential ambiguity among different connections.

Next, the first data block is sent for the connection (136). The format of the data block is <length><data>, the same format as set forth above in the context of the first connection. The sending modem then waits to receive a signal indicating whether the connection is accepted (138). If the connection is not accepted, the receiving system will return information reflecting why the connection did not succeed (140).

If the connection is accepted, more data can be sent according to the formats specified herein (142).

Figure 7:
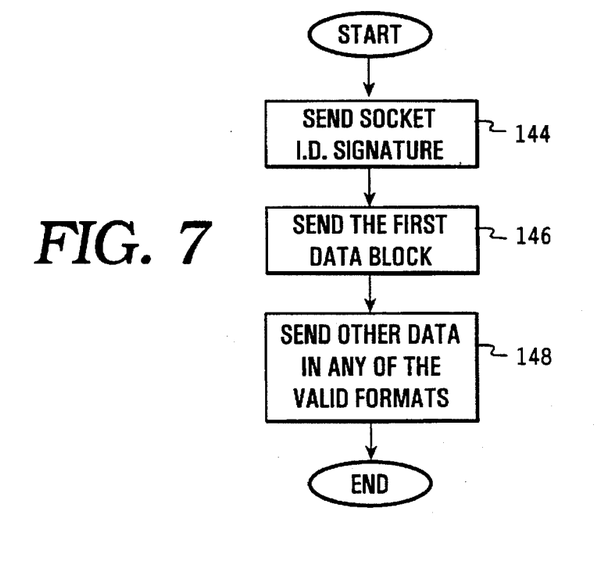
FIG. 7 is a flow diagram illustrating the steps taken to send data over an open connection in a switched voice and data communication.
Figure 8:
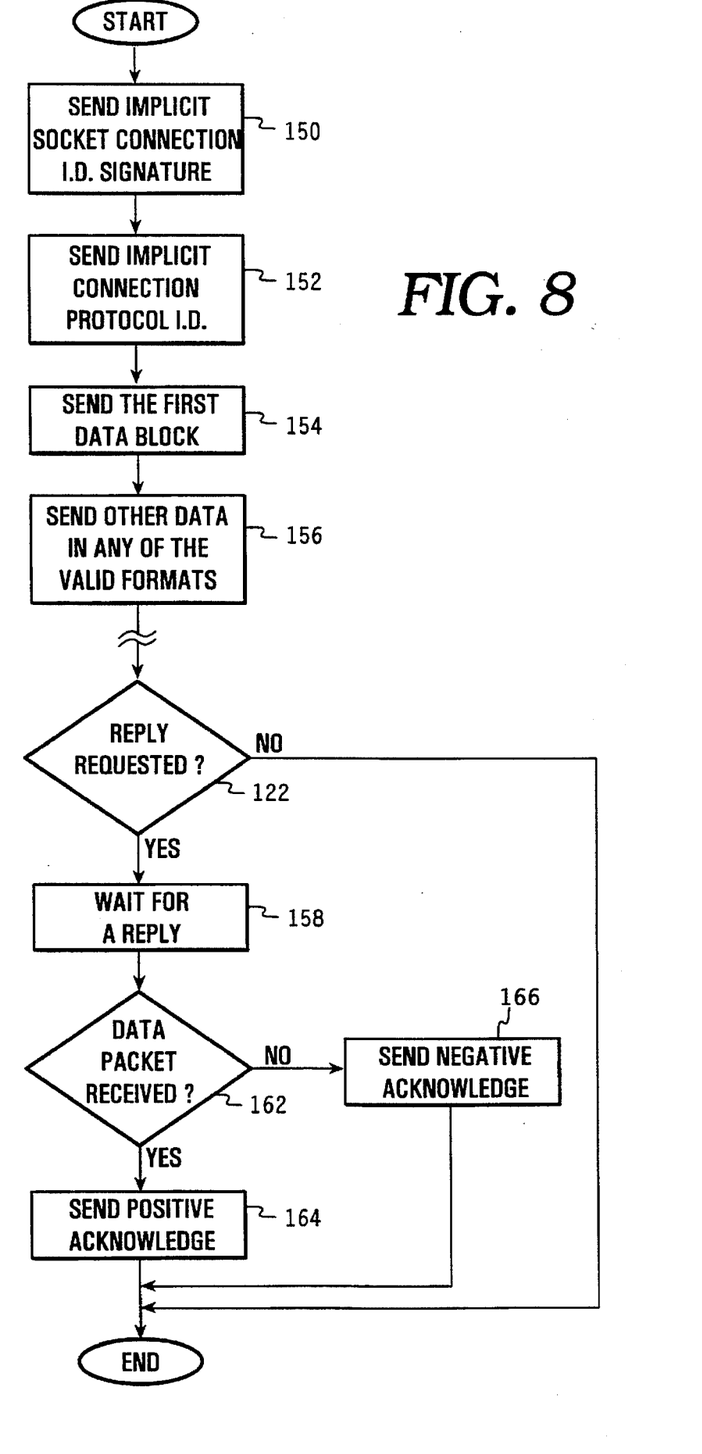
FIG. 8 is a flow diagram illustrating the steps taken to send data over an implicit connection in a switched voice and data communication.

FIGS. 7 and 8 are flow diagrams illustrating the steps that may be taken to transfer data between applications on each end of a switched voice and data communication. Data can be transferred over an open connection as depicted in FIG. 7, or data may be transferred in an implicit connection as depicted in FIG. 8. An open connection is a connection where a first application and its corresponding application have already established communication in a new connection transaction. In an implicit connection, a connection has not yet been opened between a first application and its corresponding application on a receiving system. A connection, however, has been established between the sending system where the first application resides and the receiving system, where its corresponding application resides.

FIG. 7 is a flow diagram illustrating the steps taken for sending data over an open connection. To begin this transaction, the router module sends the socket ID signature (144). This is the random value assigned to the application during the new or first connection transaction. Next, the first data block is sent in the format <length><data>, as previously set forth (146). After this block is sent, more data can be sent using any of the methods described herein (148).

FIG. 8 is a flow diagram illustrating the steps taken for sending data over an implicit connection. First, the implicit socket connection ID signature is sent (150). Next, a protocol ID is sent (152). The protocol ID is preferably a 16 byte UUID number guaranteed to be unique. After the protocol ID is transferred, the first data block is sent in the format <length><data> (154). As in the open connection, more data may be sent after the first data block is transferred (156).

Once a connection is established, the data may be sent among several applications at once. For example, data can be sent from more than one application in a sending system to corresponding applications in a receiving system in a single data block. The router module may distinguish among data from different application programs using the protocol ID and socket ID numbers. In one alternative, a first application may wait for a second application to send data and then send data with the data sent by the second application. Using this technique, interruptions in the conversation can be minimized by transferring data for more than one application in a single data block. As another alternative, information may be sent and received several times before returning to voice mode. The process of sending and then receiving data between applications may involve a request for a reply.

After an application sends data, it may request a reply. If an application requests a reply (158), the socket associated with an application waits for a reply (160). If a data packet is received as a reply (162), then receipt of the reply is acknowledged (164). If no reply is received, a signal is sent indicating that no reply has been received (166).

Figure 9:
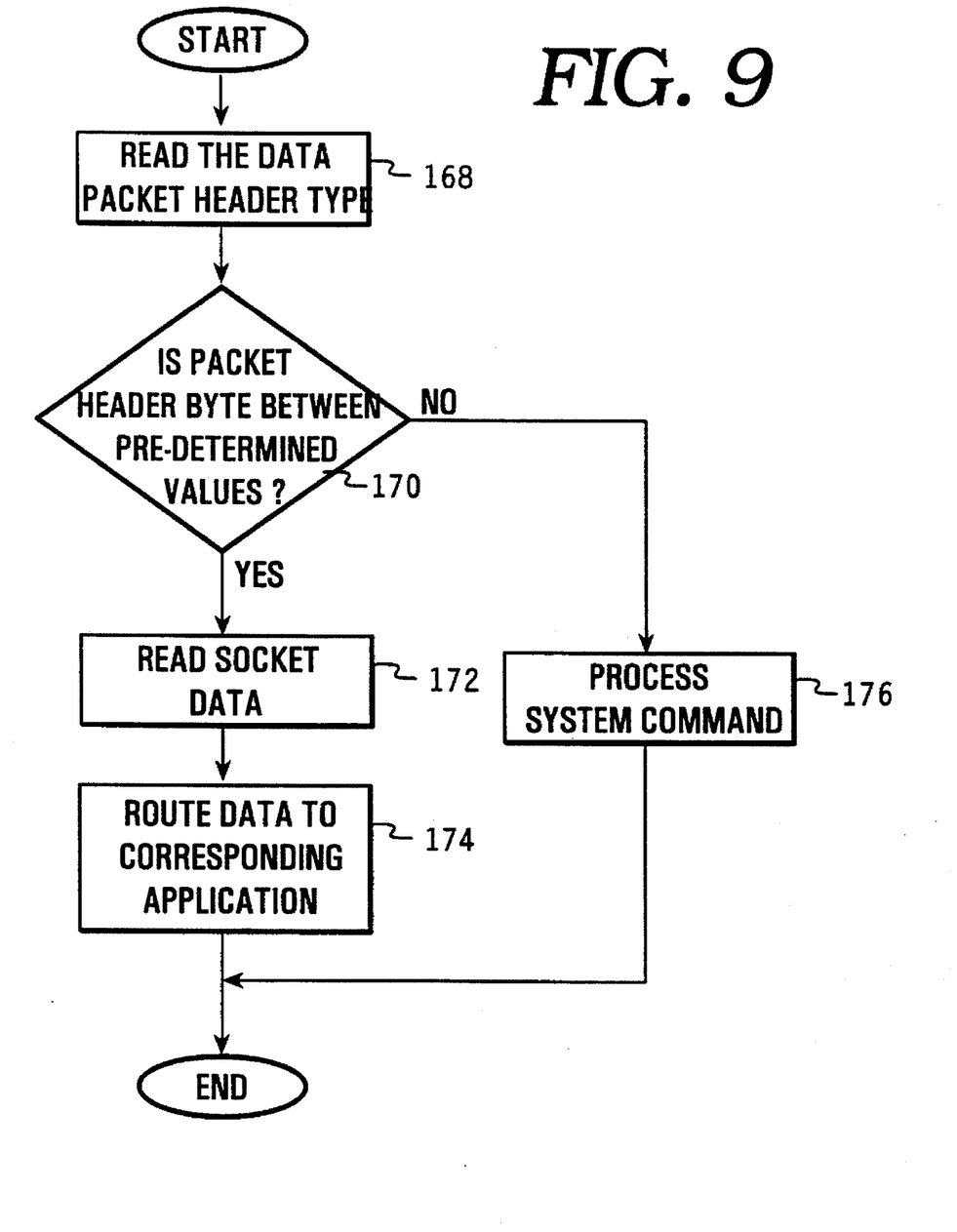
FIG. 9 is a flow diagram illustrating the steps taken to receive data over a connection in a switched voice and data communication.

FIG. 9 is a flow diagram illustrating the steps taken in receiving data. To receive data, an application must be in a listen state. When new data is received for a particular application, the sockets notify an application that new data is available to be read. The router module interprets information sent over the telephone line and determines whether the information represents data to be routed to an application or a system command to be processed.

FIG. 9 specifically illustrates the steps taken at the level of the router module when commands and data are received during an open connection. The router module first reads the data packet header byte (168). The header byte is the transaction signature and either: 1) identifies socket data; or 2) specifies a system command to be processed. In this implementation, if the packet header byte falls in a range of predetermined values (0x01 to 0xED), then socket data follows (170). When the header byte falls in this range, it represents the random socket ID number associated with a particular transaction. The router module reads the socket data and then routes the data to the corresponding application (172, 174). If the packet header is 0x00 or 0xEE through 0xFF, then it represents a system command to be processed. The router module then takes the appropriate step or steps to process the system command (176).

After an application completes a transaction, it may terminate a socket connection. To terminate a connection, a command (0xF0) is sent followed by the socket ID byte, identifying the socket to be terminated. Preferably, the end connection command should be sent with another transaction so that the voice portion of the call is not unduly interrupted.

In addition to the commands associated with the above transactions, a number of other commands may be sent. These commands are set forth in Table 2. The Enumerate Valid Sockets command enables a sending machine to verify a socket connection. The Error command can be used to send error messages back to the other machine. The Verify Connection command provides a means for verifying that a particular connection is still valid using the session ID, a UUID number. The Request User Information command allows a system on either side of a transaction to request the other's user information. In response, the system receiving the request for user information sends a command identifying the following data as user information, and then sends the data in <leng><data> format.

Though the system and methods according to an embodiment of the invention have been set forth in detail, it should be understood that many variations to the embodiments are possible without departing from the principles of invention.

In view of the many possible embodiments to which the principles of our invention may be put, it is emphasized that the detailed embodiments described herein are illustrative only and should not be taken as limiting the scope of our invention. Rather, we claim as our invention all such embodiments as may come within the scope and spirit of the following claims and equivalents thereto.

I claim:

1. A method for enabling plural application programs running on a first computer to communicate with plural application programs running on a second computer during a switched voice and data communication, wherein the first and second computer each has an application programming interface to the application programs, a router module and a communication device interface coupled to a communication device for communication over a telephone line, the method comprising:

transferring voice data over the telephone line during a telephone call using the communication device;

temporarily blocking the transfer of voice data over the telephone line during the telephone call;

transferring data from first and second application programs running on the first computer to the router module in the first computer using the application programming interface;

assigning first and second universally unique protocol identification numbers to the first and second application programs in each computer to identify data associated with the first and second application programs, respectively;

from the first and second applications in the first computer, specifying to the router module in the first computer that the first and second applications in the first computer are associated with the first and second universally unique protocol identification numbers, respectively;

from the first and second applications in the second computer, specifying to the router module in the second computer that the first and second applications in the second computer are associated with the first and second universally unique protocol identification numbers respectively;

routing the identified data from the router module of the first computer to the router module of the second computer, wherein the routing step includes constructing one or more blocks of data, each block of data having at least one header with either the first or the second universally unique protocol identification number or both the first and second universally unique protocol identification numbers to identify data from the first and second application programs; and transferring the identified data from the router module of the second computer to corresponding first and second application programs running in the second computer, using the first and second universally unique protocol identification numbers to direct the identified data to the corresponding programs.

2. The method of claim 1 wherein the routing step includes transferring a first block of data including a first and second header, the first header including the first universally unique identification number to identify data from the first application program, and the second header including the second universally unique identification number to identify data from the second application program.

3. The method of claim 1 wherein the routing step includes sending a capabilities query to determine whether the second computer has switched voice and data communication capability.

4. The method of claim 1 wherein the routing step includes sending a request for a reply; and further including the steps of:

transferring data of the corresponding first and second application program in the second computer to the router module in the second computer using the application programming interface in the second computer; and routing the data of the corresponding first and second application programs in the second computer from the router module of the second computer to the router module of the first computer.

5. A system for allowing plural application programs executing in a first computer to communicate with corresponding plural application programs executing in a remote computer in a switched voice and data communication comprising:

a communication device interface for communicating with a telephone communication device;

an application programming interface for allowing the plural application programs to share access to a telephone connection, the application programming interface including functions which enable the plural application programs to transfer data to the corresponding plural application programs executing in a remote computer by specifying unique protocol identification numbers that uniquely identify the plural application programs and data associated with the plural application programs;

a telephone line device driver in communication with the communication device interface for controlling the telephone communication device;

a call manager module in communication with the telephone line device driver for issuing commands to switch the telephone communication device between voice and data transfer modes; and a router module in communication with the application programming interface for receiving the data from the plural application programs and formatting the data and the unique protocol identification numbers into one or more data blocks for transfer through the communication device interface, the router module in communication with the call manager module to switch the telephone communication device to data transfer mode; wherein the router module is operable to transfer the one or more data blocks to the communication device interface when the telephone communication device is switched to data transfer mode during the switched voice and data communication.

6. The system of claim 5 wherein the router module is in communication with the communication device interface for receiving a block of data including application data associated with each of the plural application programs, for interpreting the block of data to identify the unique protocol identification numbers of each of the plural application programs, and for routing the application data in the block of data to the plural application programs.

7. The system of claim 5 wherein the application programming interface is operable to create a socket connection between a local and a remote socket and is operable to associate one of the unique protocol identification numbers with the socket connection.

8. A method for switched voice and data communication among corresponding application programs executing in first and second computers interconnected through a phone line, each of the first and second computers including a router module and a communication device interface coupled to a modem for communication over the phone line, the method comprising:

establishing communication between the router modules in the first and second computers;

blocking a voice communication over the phone line;

from a first application program, passing a first unique protocol identification number and data associated with the first application program to the router module;

from a second application program, passing a second unique protocol identification number and data associated with the second application program to the router module;

communicating the first and second unique protocol identification numbers associated with the first and second application programs from the router module in the first computer to the router module in the second computer; and routing the data associated with the first and second application programs in the first computer to the corresponding first and second application programs in the second computer by constructing one or more blocks of data including the first and second unique protocol identification numbers to identify the data associated with the first and second application programs, sending the one or blocks of data to the second computer and using the first and second unique protocol identification numbers to route the data to the corresponding first and second application programs; and for subsequent communication between the application programs in the first and second computers, selecting a random identifier to identify data transfers between corresponding application programs, and routing data using the selected random identifier to route data between the corresponding application programs.

9. The method of claim 8 wherein the step of establishing communication between router modules includes establishing a connection between corresponding sockets in the first and second computers, wherein the first and second application programs in the first and second computer each have an associated socket, wherein the first unique protocol identification number identifies the corresponding sockets associated with the first application programs in the first and second computers, and the second unique protocol identification number identifies the corresponding sockets associated with the second application programs in the first and second computers.

10. The method of claim 9 further including the step:

after establishing a connection between corresponding sockets, selecting a random socket ID number to identify the corresponding sockets for subsequent transfers of data through the corresponding sockets.

11. A computer implemented method for enabling plural application programs executing in a first computer to communicate with corresponding versions of the plural application programs executing in a second computer during a switched voice and data communication over a telephone line, the method comprising:

issuing a first command to a modem supporting switched voice and data communication to switch the modem into a voice mode so that voice data is transferred over the telephone line during a telephone call;

issuing a second command to the modem supporting switched voice and data communication to switch the modem into a data mode such that the transfer of voice data over the telephone line during the telephone call is temporarily blocked;

while the modem is in data mode, performing the following steps:

sending a first unique protocol ID assigned to a first application program executing in the first computer and a corresponding first application program executing in the second computer to the modem for transfer to the second computer;

sending a first block of data associated with the first application program to the modem for transfer to the second computer, wherein the first block of data is identified with the first unique protocol ID;

sending a second unique protocol ID assigned to a second application program executing in the first computer and a corresponding second application program executing in the second computer; and sending a second block of data associated with the second application program to the modem for transfer to the second computer, wherein the second block of data is identified with the second unique protocol ID.

12. The method of claim 11 further including:

while the modem is in the data mode, performing the steps of:

sending a first connection ID along with the first block of data;

for subsequent data transfer between the first application program in the first and second computers, using the first connection ID to route data between the first application program in each of the first and second computers;

receiving a third block of data from the first application executing in the second computer, wherein the third block of data is identified by the first connection ID; and routing the third block of data to the first application program executing in the first computer.

13. The method of claim 11 further including establishing a first socket connection between the first application program and the corresponding first application program executing in the second computer using the first unique protocol ID to identify corresponding sockets associated with the first application program and the corresponding first application program in the first and second computers, respectively.

14. The method of claim 11 further including establishing a first socket connection between the first application program and the corresponding first application program executing in the second computer using the first unique protocol ID to identify corresponding sockets associated with the first application program and the corresponding first application program in the first and second computers, respectively; and establishing a second socket connection between the second application program and the corresponding second application program executing in the second computer using the second unique protocol ID to identify corresponding sockets associated with the second application program and the corresponding second application program in the first and second computers, respectively.

15. The method of claim 11 including the step of:

sending the first and second data block in a single, contiguous block of data to the second computer to minimize interruption of voice data transfer during the telephone call.

16. The method of claim 11 further including:

randomly selecting a connection ID to replace the first protocol ID in subsequent data transfers between the first application program in the first computer and the corresponding application program in the second computer; wherein the connection ID is a shorter number than the first protocol ID so as to minimize data transfer between the first and second computer.

* * * * *

UNITED STATES PATENT AND TRADEMARK OFFICE
CERTIFICATE OF CORRECTION

PATENT NO. : 5,625,678

DATED : April 29, 1997

INVENTOR(S) : Blomfield-Brown

It is certified that error appears in the above-indentified patent and that said Letters Patent is hereby corrected as shown below:

Column 2, line 26, "computers," should read --computers.--.

Column 16, line 19, "numbers respectively;" should read --numbers, respectively--.

Signed and Sealed this

Twenty-first Day of July, 1998

Attest:

BRUCE LEHMAN

*Attesting Officer*  *Commissioner of Patents and Trademarks*